United States Patent
De Groen et al.

(10) Patent No.: US 11,925,296 B2
(45) Date of Patent: *Mar. 12, 2024

(54) GRINDING DEVICE, COFFEE MACHINE AND METHOD FOR ADJUSTMENT THEREOF

(71) Applicant: J.M. DE JONG DUKE AUTOMATENFABRIEK B.V., Sliedrecht (NL)

(72) Inventors: Cornelis De Groen, Sliedrecht (NL); Maarten Wassink, Sliedrecht (NL); Karen Harbers, Sliedrecht (NL); Yvo Pluymakers, Sliedrecht (NL)

(73) Assignee: J.M. DE JONG DUKE AUTOMATENFABRIEK B.V., Sliedrecht (NL)

( * ) Notice: Subject to any disclaimer, the term of this patent is extended or adjusted under 35 U.S.C. 154(b) by 183 days.

This patent is subject to a terminal disclaimer.

(21) Appl. No.: 17/416,793

(22) PCT Filed: Dec. 20, 2019

(86) PCT No.: PCT/NL2019/050862
§ 371 (c)(1),
(2) Date: Jun. 21, 2021

(87) PCT Pub. No.: WO2020/130827
PCT Pub. Date: Jun. 25, 2020

(65) Prior Publication Data
US 2022/0133091 A1    May 5, 2022

(30) Foreign Application Priority Data
Dec. 20, 2018  (NL) .................................. 2022272

(51) Int. Cl.
*A47J 42/18*   (2006.01)
*A47J 31/06*   (2006.01)
(Continued)

(52) U.S. Cl.
CPC .............. *A47J 42/18* (2013.01); *A47J 42/16* (2013.01)

(58) Field of Classification Search
CPC ............ A47J 42/12; A47J 42/16; A47J 42/18
See application file for complete search history.

(56) References Cited

U.S. PATENT DOCUMENTS

| | | |
|---|---|---|
| 5,564,636 A | 10/1996 | Mock et al. |
| 9,198,535 B2 | 12/2015 | Righetti |

(Continued)

FOREIGN PATENT DOCUMENTS

| | | | |
|---|---|---|---|
| CH | 237180 A | * | 4/1945 |
| DE | 4016924 A1 | * | 11/1991 |

(Continued)

OTHER PUBLICATIONS

English translate (CH237180A), retrieved date Jun. 28, 2023.*
English translate (DE4016924A1), retrieved date Jun. 28, 2023.*
English translate (DE29917567U1), retrieved date Jun. 28, 2023.*
International Search Report, dated Apr. 1, 2020, issued in corresponding PCT application No. PCT/NL2019/050862, filed Dec. 20, 2019.

*Primary Examiner* — Matthew Katcoff
*Assistant Examiner* — Mohammed S. Alawadi
(74) *Attorney, Agent, or Firm* — PERRY + CURRIER, INC.

(57) ABSTRACT

Grinding device, coffee machine and method for adjustment thereof. A grinding device (100) comprises a grinding housing (101) with mutually co-acting grinding bodies (110, 120). A lower of the two grinding bodies (110) is both driven and axially adjustable for the purpose of setting a grind size. An upper grinding body (120) is removable. A grind size of (Continued)

the grinding device can be adjusted in absolute manner between a first extreme position and a second extreme position, corresponding to a fixed setting range between a minimal clearance between the two grinding surfaces and a maximum clearance between the two grinding surfaces. An extreme position of the adjustable grinding body is imposed by a stop which is encountered by the adjusting means in the relevant extreme position. A coffee machine uses the absolute grind size and/or a fine-tuning for an optimal contact time between coffee and through-flowing water.

25 Claims, 5 Drawing Sheets

(51) Int. Cl.
*A47J 31/34* (2006.01)
*A47J 31/52* (2006.01)
*A47J 42/16* (2006.01)

(56) References Cited

U.S. PATENT DOCUMENTS

| | | | |
|---|---|---|---|
| 9,532,682 B1 * | 1/2017 | Lassota | A47J 42/46 |
| 2005/0279219 A1 * | 12/2005 | Turi | A47J 42/16 |
| | | | 99/286 |
| 2018/0206668 A1 | 7/2018 | Sahli et al. | |

FOREIGN PATENT DOCUMENTS

| | | | | |
|---|---|---|---|---|
| DE | 29917567 U1 * | 12/1999 | | A47J 42/12 |
| ES | 2380402 T3 | 5/2012 | | |
| ES | 2525965 A1 | 1/2015 | | |
| JP | S4929189 U | 3/1974 | | |
| JP | S4937586 U | 4/1974 | | |
| JP | 2004174092 A | 6/2004 | | |
| JP | 2010527677 A | 8/2010 | | |
| WO | 2013121438 A1 | 8/2013 | | |

* cited by examiner

GRINDING DEVICE, COFFEE MACHINE AND METHOD FOR ADJUSTMENT THEREOF

The present invention relates to a grinding device comprising drive means and a grinding housing, which grinding housing comprises a set of mutually co-acting grinding bodies with mutually facing, at least substantially parallel grinding surfaces which maintain a mutual clearance, wherein at least a driven grinding body of the set of grinding bodies is suspended rotatably about a central axis thereof in the grinding housing and is coupled, or at least can be coupled, operatively to the drive means for performing a rotation about the central axis during operation, and wherein adjusting means are provided whereby at least an adjustable grinding body of the set of grinding bodies is axially adjustable for imposing a desired mutual clearance between the grinding surfaces.

The invention also relates to a coffee machine comprising a grinding device for grinding coffee beans into coffee powder with a determined grind size; a decoction device with an extraction chamber in which a quantity of coffee powder taken away from the grinding device is received, which decoction device is intended and configured to compress the coffee powder into a bed in the extraction chamber using a pressing force; an inlet for hot water on an inlet side of the extraction chamber and an outlet for the obtained coffee extract on an outlet side of the extraction chamber; water supply means which are able and configured to guide a quantity of water with increased temperature to the inlet under increased pressure via a water conduit; an outflow at which a coffee product can be taken away and which is connected to the outlet of the extraction chamber over a product conduit; and an electronic control unit which is able and configured to impart at least a preset to the machine, comprising one or more of the grind size, the quantity of coffee powder, the pressing force, the quantity of water, the increased pressure and the increased temperature, and to control means provided for this purpose. The invention further relates to a method for adjusting a grinding device.

A grinding device of the type described in the preamble is applied on large scale as coffee bean mill or grinder, with which coffee beans are ground into powdery grounds from which a coffee extract is extracted with hot water. This relates particularly to a bean grinder which is built into a coffee machine with which a hot coffee product is prepared from the grounds. The grounds are usually compressed into a compact bed before a coffee extract is obtained therefrom with hot water under optionally increased pressure. The coffee product can basically vary from espresso coffee to filter coffee of varying strength, depending on the water pressure applied, compactness of the coffee bed and quantity of water in relation to the quality of coffee powder, wherein milk, milk powder and/or sweetener (sugar) can be added as desired for thereby preparing different coffee products.

The coffee beans are placed in the grinding housing and then received between the set of grinding bodies, also referred to as grinding discs. At least one of the two grinding bodies rotates during operation, and will thereby set the beans into motion. The grinding surfaces usually have a series of cutting edges whereby the coffee beans gripped between the grinding discs are ground into a granular coffee powder. A clearance between the two grinding bodies here defines substantially a grind size of the obtained grounds. The smaller this clearance, the finer the grounds. And, vice versa, the greater this clearance, the coarser the obtained grounds will be.

In addition to a temperature, pressure, quantity and retention time of the hot water, whereby a coffee extract will be extracted from the grounds, this grind size, together with a quantity of the grounds, is an important parameter in a given source product for the quality and flavour of a drink to be prepared therefrom. In order to be able to adjust the grind size the known grinding device has optionally powered adjusting means whereby at least one of the set of grinding bodies is adjustable. The clearance between the set of grinding bodies can hereby be adjusted, and so the grounds ground to a finer or coarser setting. This results in a more or less concentrated (strong) extract which is obtained from the grounds, and also affects the essential oils and other flavourings which will be extracted from the powder.

A drawback of the known grinding device is that the adjustment of the grind size is here only relative. From a current setting it is only possible to adjust gradually to a finer or coarser setting. This setting is then lost if one of the two grinding bodies is removed and then replaced, for instance in the case of malfunction or for inspection and maintenance. The known grinding device does not allow a fixed predetermined and absolute setting of the grind size to be imposed. In practice, this imposes a significant limitation on a desired control of the device, for instance on coffee quality and flavour, particularly if the device must form part of a system with which a coffee quality can be monitored and/or adjusted remotely.

The present invention therefore has for its object, among others, to provide a grinding device and device for preparing a hot drink which allows an absolute, precisely determined setting of the grind size.

In order to achieve the stated object a grinding device of the type described in the preamble has the feature according to the invention that an adjustment of the adjustable grinding body is limited from a first extreme position to a second extreme position, corresponding to a fixed setting range between a minimal clearance between the two grinding surfaces and a maximum clearance between the two grinding surfaces, wherein at least one of the first extreme position and the second extreme position of the adjustable grinding body is imposed by a stop which is encountered by the adjusting means in the relevant extreme position. An adjustment of the grind size will thus always be limited to a fixed setting range which runs from a determined minimum to maximum clearance.

At least one of these extreme positions can be detected by the adjusting means of the device, whereby a fixed reference is obtained relative to which an absolute setting of the grind size is then possible by adjusting the adjustable grinding body from this position over a fixed distance to a position within the setting range. This provides for a full control over the clearance imposed thereby between the grinding bodies, and thereby over the set grind size. In a preferred embodiment the grinding device according to the invention has the feature here that the at least one extreme position corresponds to the maximum clearance between the two grinding surfaces. The position from which said reference is taken thus corresponds to a maximum clearance between the two grinding bodies, so that it will not be disrupted by grounds and/or bean residues which may be present between the two grinding bodies.

A single reference, which can be deduced from the stop as soon as the stop is encountered by the adjusting means, will suffice per se. A particular embodiment of the grinding device however has the feature according to the invention that the setting range is imparted by a first stop on the grinding device, which is encountered in a first extreme position by the adjusting means and which corresponds to the minimum clearance, and by a second stop on the grinding device, which is encountered in a second extreme position by the adjusting means and which corresponds to the maximum clearance. Both an upper limit and a lower limit of the adjustment of the adjustable grinding body, and thereby the whole setting range, are thus fixed in the construction of the grinding device.

A particular embodiment of the grinding device according to the invention has the feature here that the grinding housing comprises the at least one stop and that the adjustable grinding body comprises a stop surface, which stop surface is received on the stop in the relevant extreme position. The grinding housing comprises here the at least one stop whereby the limit of the setting range corresponding thereto is determined. The adjustable grinding body comprises here a stop surface which strikes against the stop in the relevant extreme position, whereby an adjustment thereof is limited to within the setting range.

A preferred embodiment of the grinding device has the feature here that an adjusting device, which is connected adjustably to the adjustable grinding body, comprises the stop surface. An adjustment of the adjusting device relative to the adjustable grinding body, and thereby to the stop surface comprised thereby, thus enables the setting range to be shifted as a whole in order to thus be able to optimally adapt the upper limit and lower limit thereof, although collectively, to a concrete need. For the purpose of a possible visual inspection of a concrete setting of the grinding device a further particular embodiment has the feature here that the adjusting device comprises a scale division and the grinding housing a window behind which the adjusting device moves during setting of the adjustable grinding body, while a current setting is visible via the window.

Although the adjustment of the adjustable grinding body, for instance with an adjusting screw or other member, can be implemented manually, a preferred embodiment of the grinding device according to the invention has the feature that the adjusting means comprise a controllable actuator which is or at least can be operatively coupled to said adjustable grinding body in order to impart thereto a controlled axial adjustment along the central axis. By driving the actuator from a control unit provided for this purpose an adjustment and setting of the grind size can thus take place wholly autonomously by and inside the grinding device.

A further particular embodiment of the grinding device has the feature here according to the invention that said adjustable grinding body comprises a primary screw thread which is operatively engaged with a secondary screw thread of the grinding housing, that the actuator comprises an electric motor with an output drive shaft and that a transmission is provided between the drive shaft of the electric motor and the adjustable grinding body so as to impart to the adjustable grinding body a controlled rotation about a collective screw shaft of the primary and secondary screw thread. The adjustable grinding body is thus received in the grinding housing in axially adjustable manner, wherein a degree of adjustment within the setting range will be determined by the number of revolutions imparted to the drive shaft of the electric motor in combination with an optional transmission ratio of the transmission and the pitch of the primary and secondary screw thread.

In order to enable the grinding device to take up a predetermined setting a further preferred embodiment of the grinding device according to the invention has the feature that the actuator, at least during operation, can be controlled by a control unit, which control unit is provided with memory means in which a position imposed thereby on the actuator is stored, which memory means comprise in particular non-volatile electronic memory means. An intended position can thus always be read from the memory by the control unit so that the grinding device, for instance after having been adjusted, is able to return to the intended setting. When a non-volatile memory is applied, this is still possible even after a power interruption.

A further preferred embodiment of the grinding device according to the invention has the feature that the at least one adjustable grinding body and the at least one driven grinding body both comprise a first of the set of mutually co-acting grinding bodies. The relevant grinding body provides here for both the intended adjustability of the grind size and the grinding process itself. The other grinding body can thereby remain of low complexity. In a further embodiment the grinding device is therefore characterized in that a second, opposite grinding body of the set of mutually co-acting grinding bodies is arranged in stationary manner.

For the purpose of possible interim or periodic maintenance or repairing a malfunction it is desirable that the grinding device can be taken apart if desired, particularly in respect of the grinding bodies therein. If a foreign object such as a stone has for instance come to lie between the grinding surfaces unexpectedly, and the device thereby becomes jammed or does not function correctly, this provides the option of eliminating such a problem. A further particular embodiment of the grinding device according to the invention in this respect has the feature that the second grinding body is connected to the grinding housing in manually detachable manner. If desired, the second grinding body can thus be removed in order to thus expose the grinding surfaces and make them accessible for inspection and/or maintenance.

It is desirable here for the second grinding body to once again take up its original position as far as possible when it is replaced in the grinding housing, so that the set clearance relative to the other grinding body thereby does not change, or hardly so. With a view to this, a further particular embodiment of the grinding device according to the invention has the feature that the second grinding body can be arranged up to a further stop in the grinding housing and strikes against the further stop when it is placed, and more particularly that a bayonet connection is formed between the second grinding body and the grinding housing. This further stop, such as for instance the end position of a bayonet closure, here also provides a fixed reference for the setting range of the adjustable grinding body, whereby the absolute value of an intended setting can be at least largely guaranteed as long as neither of the two grinding bodies is replaced or has been subjected to too much wear. A relatively simple calibration or full reset can however also suffice in the latter case to once again ensure correct, absolute setting values.

Besides using the stop, it is also possible in other ways to ensure that the second grinding body is placed correctly in the grinding housing. A particular preferred embodiment of the grinding device according to the invention has in this respect the feature that an outflow opening is provided in a wall of the grinding housing, at the position of which opening a powder tube can be coupled releasably to the wall, wherein provided on the second grinding body is a collar which leaves space for the powder tube when the second grinding body strikes against the stop, but prevents coupling of the powder tube in the case of an incomplete placement of the second grinding body. The collar thus prevents the outflow from being placed if the second grinding body has not been arranged correctly. Continued operation of the grinding device is thus prevented as indication that the second grinding body has not been placed correctly at an end position in the grinding housing.

In order to limit a sound level and vibrations of the grinding device a further embodiment of the grinding device according to the invention has the feature that provided between the second grinding body and the adjacent part of the grinding housing are damping means which are able and configured to absorb vibrations during operation, and more particularly that the damping means comprise a flexible lining. Limiting the sound level of the device imparts commercial advantages to a coffee dispenser which the grinding device is built into. A quieter coffee dispenser will sell better; particularly in cases where coffee dispensers are placed in offices. In addition, limiting the vibrations also has advantages in the construction of the dispenser; vibrations are thus transmitted to other components of the dispenser, particularly to optional powder dosing means, to lesser extent, whereby they function better.

According to the invention, a further preferred embodiment of the grinding device has the feature that the drive means comprise a drive platform with a main motor and with an actuator, that the main motor is or at least can be operatively coupled with a first transmission to the driven grinding body, that the actuator is or at least can be operatively coupled with a second transmission to the adjustable grinding body, and that the grinding housing is coupled to the drive platform in manually detachable manner. It is thus not just one of the grinding bodies which is optionally removable, the grinding housing as a whole can be completely taken off and, if built in, removed. This facilitates maintenance and inspection of the grinding device in that the grinding housing, which is usually the most susceptible to malfunction and wear, is fully accessible without requiring further tools and, if desired, can be replaced as a whole. With a view to reducing sound and vibrations further the grinding device has in a further embodiment the feature here that provided between the grinding housing and the drive platform are damping means which are able and configured to absorb vibrations during operation, and more particularly that the damping means comprise a flexible lining.

A powered, adjustable grind size, for instance of the type as described above, provides an additional parameter to an electronic control unit for a control of the decoction process of a coffee machine. The powder can thereby be given a fineness or coarseness which, in addition to a quantity of the powder, influences at a determined pressing force of the coffee bed a resistance of the coffee bed, and thereby a coffee-water contact time, to great extent. The invention is based inter alia on the insight that this contact time in particular determines a flavour and quality of the end product.

In a further aspect the present invention has for its object, among others, to provide a coffee machine in which the coffee-water contact time can be adjusted more accurately.

A coffee machine of the type described in the preamble has for this purpose the feature according to the invention that the control unit is coupled to at least one sensor which is able and configured to register a liquid flow speed through the machine and generate it in the form of an electronic value, particularly a flow speed of a product flow through the product conduit from the extraction chamber or of a water flow through the water conduit to the extraction chamber, that the liquid flow can be adjusted at least partially by a fine-tuning and is controlled by the control unit, and that the control unit is able and configured on the basis of a received value of the liquid flow speed to impart a fine-tuning to the machine, whereby the liquid flow speed can be tuned to a predetermined value. This value is here particularly adjusted and imparted such that a predetermined contact time between coffee and through-flowing water is achieved.

In a particular embodiment the coffee machine according to the invention is here characterized in that the product conduit comprises a controllable restriction and that the fine-tuning comprises at least one of a controllable pump and the controllable restriction in the product conduit for a control of at least one of the increased pressure and a resistance of the restriction. An adjustment of for instance a pump pressure or resistance in the product conduit thus enables the machine to adjust the coffee-water contact time during the preparation process and tune it to a desired value. In a subsequent preparation cycle the preset can then optionally be adjusted on the basis of historical empirical data of this fine-tuning, so that a possibly necessary fine-tuning will then remain limited. It is hereby possible to adequately anticipate climatological factors such as air humidity and ambient temperature, which also influence a resistance and counter-pressure of the compressed coffee bed.

The absolute, predetermined setting of the grind size of the grinding device according to the invention provides particular options when applied in a device for preparing a hot drink, such as a coffee machine for preparing a coffee product, wherein an extract is extracted from the grounds with hot water. This is because an optional automatic grind setting can here be coupled to an absolute scale. This means that setting and monitoring of the fineness of the coffee can no longer take place substantially only with the retention time of the product, but now also with a direct, absolute setting of the grind size, and so also with a formula. A coffee formula typically has a fineness on the basis of the type of coffee, type of bean and the dosage. A preferred embodiment of a coffee machine of the type described in the preamble therefore has the feature according to the invention that the grinding device comprises a grinding device according to the invention, wherein the control unit is operatively coupled to the adjusting means of the grinding device and, together therewith, is able and configured to impose a defined, absolute position on the adjustable grinding body as part of the preset.

The advantage of the present invention is that it is possible, for instance using software, to tune on the basis of a real scale. It is thereby possible to tune on the basis of a plurality of parameters when composing a (coffee) formula; this provides the grinding device, and so a machine equipped therewith as well, with an important distinguishing feature and technical improvement in the market. Most if not all of the parameters which determine the quality and flavour of the product taken away can thus be brought under control and be adjustable within the limits of the machine.

A particular embodiment of the coffee machine further has the feature here that the control unit comprises an electronic memory, preferably a non-volatile memory, in which the defined, absolute position is stored, and that the control unit is able and configured to impart a resetting process to the grinding device, whereby the grinding device is reset from an adjusted state to the stored position. The information which determines the grind size is hereby stored in or at the device, so that said resetting process can be imparted to the machine in simple manner, for instance after manual adjustment of the grinding device in the case of inspection or maintenance, so that the grinding device once again takes up its correct setting.

For a more complete control over and adjustability of the product quality a further particular embodiment of the coffee machine according to the invention has the feature that the control unit is coupled to at least one sensor which is able and configured to register a liquid flow speed through the device and generate it in the form of an electronic value, particularly a flow speed of a product flow through the product conduit from the extraction chamber or of water flow through the water conduit to the extraction chamber, and that the liquid flow can be adjusted by control means and is controlled by the control unit, and more particularly that the control means comprise at least one of a controllable pump and a controllable restriction in the product conduit. For the purpose of preparing an espresso-like coffee product the coffee powder is usually compressed into a compact coffee bed in the extraction chamber before hot water is guided therethrough in order to obtain the coffee extract. In practice it has been found to be mainly a contact time between the hot water and the coffee bed which greatly influences the flavour and quality of the end product. This contact time can be derived or calculated by the control unit from the registration of the flow speed of the liquid flow through the machine.

Together with the fineness of the powder, a pressing force with which the coffee powder is compressed in the extraction chamber determines a resistance encountered by the hot water from the coffee bed. This resistance determines to a significant degree said contact time between the hot water and the coffee bed. If the control unit detects too short a contact time, this can be acted upon by the control unit by imparting a higher compacting pressure at which the coffee powder is compressed into the coffee bed, but now also by imparting a finer grind size to the grinding device. The absolute, direct control of the grinding device according to the invention allows here a control which is defined at least largely algorithmically and is not determined only experimentally. It is thus for instance also possible to take into account less controllable ambient factors such as temperature and air humidity, which can likewise influence the grounds and the final resistance of the coffee bed.

The coffee machine according to the invention is highly suitable for application as part of a more comprehensive system for decocting coffee and dosing powders. The bean grinder is controlled by the coffee machine and read and, if necessary, controlled remotely by means of a telecommunication connection. For this purpose a particular embodiment of the coffee machine according to the invention has the feature that the control unit is provided with communication means which are able and configured to form a telecommunication connection with a remotely placed server device in order to generate thereto operational measurement values and receive therefrom one or more control parameters.

A method for adjusting a grinding device according to the invention has the feature that the adjustable grinding body is carried to an extreme position, corresponding to the maximum clearance between the two grinding bodies, until the stop corresponding therewith is encountered by the adjusting means in the relevant extreme position, and that the adjustable grinding body is reset from the extreme position to a position to be imposed. Because the clearance between the two grinding bodies is here first carried to a completely open position before returning to the value to be set, it is prevented that (grinding) residues which may be present between the grinding bodies disrupt the taking up of an extreme position of the setting range.

The encountered extreme position can thereby be reliably deemed the extreme limit of the setting range and be used as reference for then carrying from there to the position to be imposed. In a further particular embodiment the method is characterized here in that the adjusting means comprise an actuator which can be driven and which is controlled by a control unit, that the control unit reads a position to be imposed on the actuator from memory means, particularly non-volatile electronic memory means, and that the control unit controls the actuator on the basis of the position to be imposed, obtained from the memory means. The adjustment takes place fully automatically here, under the control of the control unit.

The invention will be further elucidated hereinbelow with reference to an exemplary embodiment and an accompanying drawing. In the drawing.

It is otherwise noted here that the figures are purely schematic and not all drawn to (the same) scale. Some dimensions in particular may be exaggerated to greater or lesser extent for the sake of clarity. Corresponding parts are designated in the figures with the same reference numeral.

Figure 1:
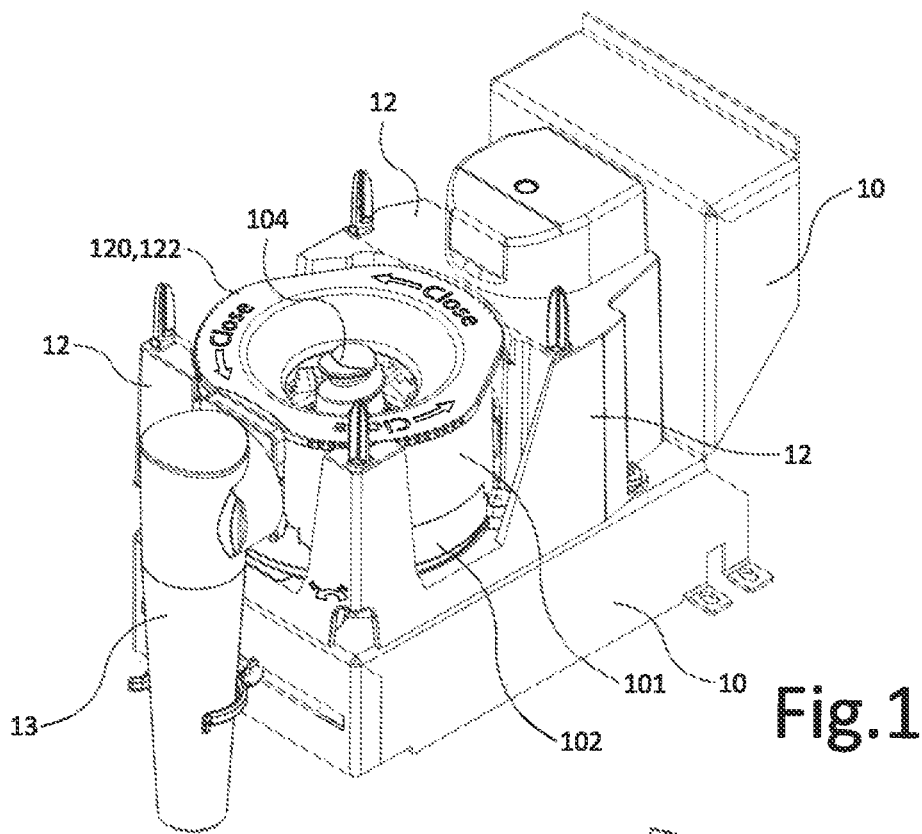
FIG. 1 is a perspective view of an exemplary embodiment of a grinding device according to the invention, built into a coffee machine.

FIG. 1 shows a grinding device 100 according to the invention, mounted on or at a part of a chassis or frame 10 of a coffee machine in which the grinding device is integrated. The grinding device is here neatly covered with a plastic cover or casing 12. The further construction of the coffee machine is deemed sufficiently known to an average skilled person, and is therefore not further shown in the figure. The coffee machine, also referred to as coffee dispenser or espresso machine, comprises above the shown grinding device a coffee bean reservoir (not further shown here) which continuously feeds coffee beans to the grinding device on the upper side via a central inflow opening 105.

Figure 2:
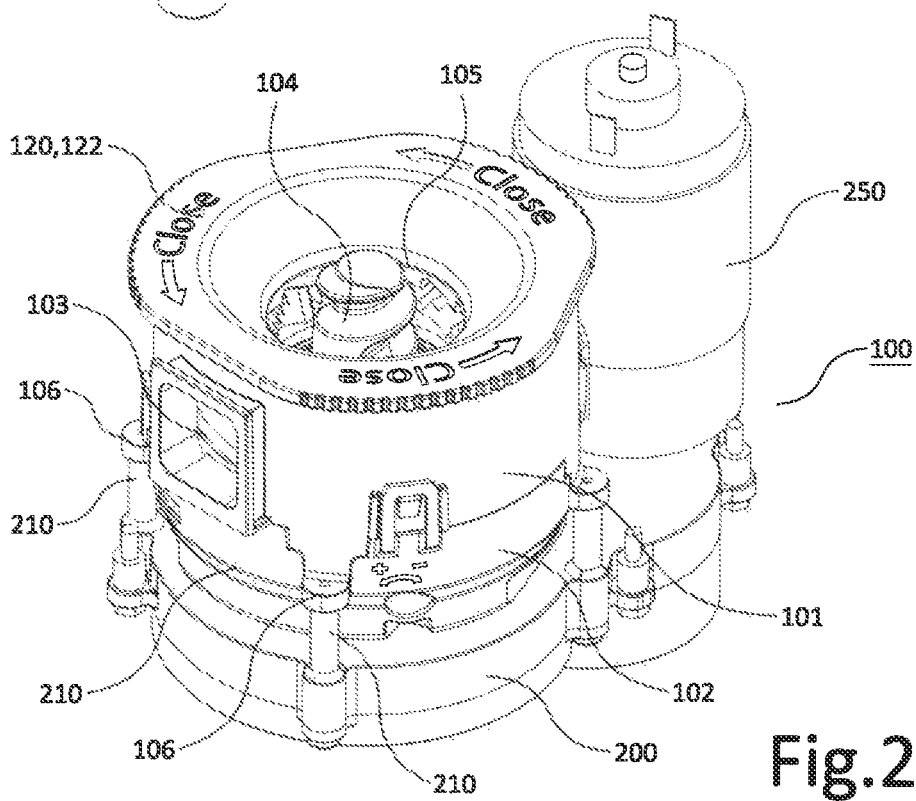
FIG. 2 is a cut-away perspective view of the grinding device of FIG. 1.
Figure 3:
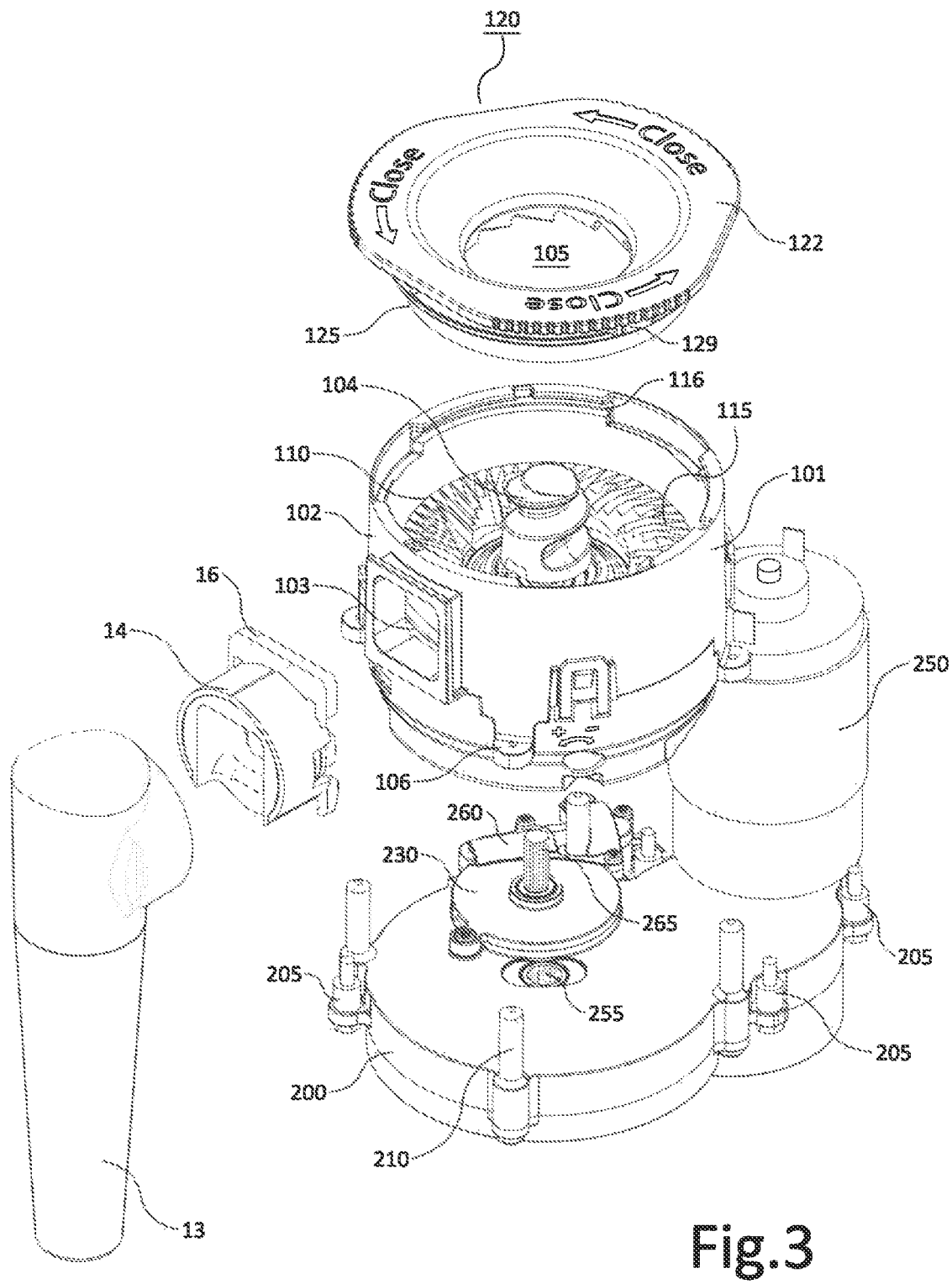
FIG. 3 is an exploded view of the grinding device of FIG. 1.
Figure 4:
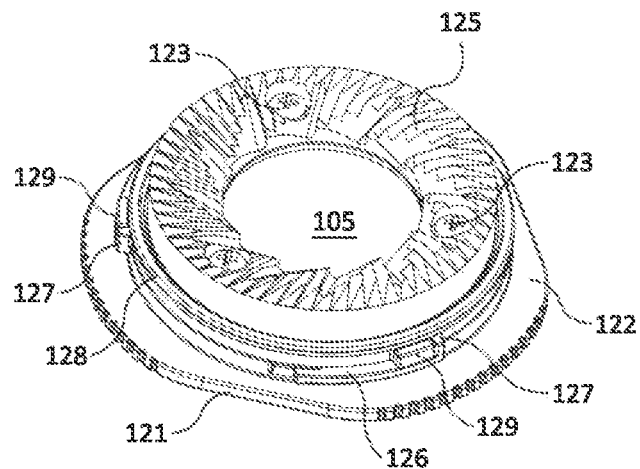
FIG. 4 is a perspective bottom view of a stationary grinding body of the grinding device of FIG. 1.

This open side debouches in a grinding housing 101 which is further shown in FIGS. 2 and 3, without the casing 12. Grinding housing 101 is substantially formed from aluminium and carries externally on an underside a plastic protective cover 102 which is snapped fixedly thereon. Internally, grinding housing 101 comprises a set of grinding discs 115, 125, see also FIG. 4, between which the supplied coffee beans are received. A worm or screw 104 rotates during operation and forces the beans into a narrow gap between the respective grinding surfaces of the two grinding discs 115, 125. The beans are ground into fine coffee grounds (powder) by a relative rotation of the grinding discs. The grinding surfaces of the two grinding discs comprise for this purpose a clever pattern of cutting edges which acts on the coffee beans. The obtained powder is dispensed at an outflow opening 103 and leaves the grinding device via a coffee (powder) tube 13, provided for this purpose, to an extraction chamber of the coffee machine.

Figure 5:
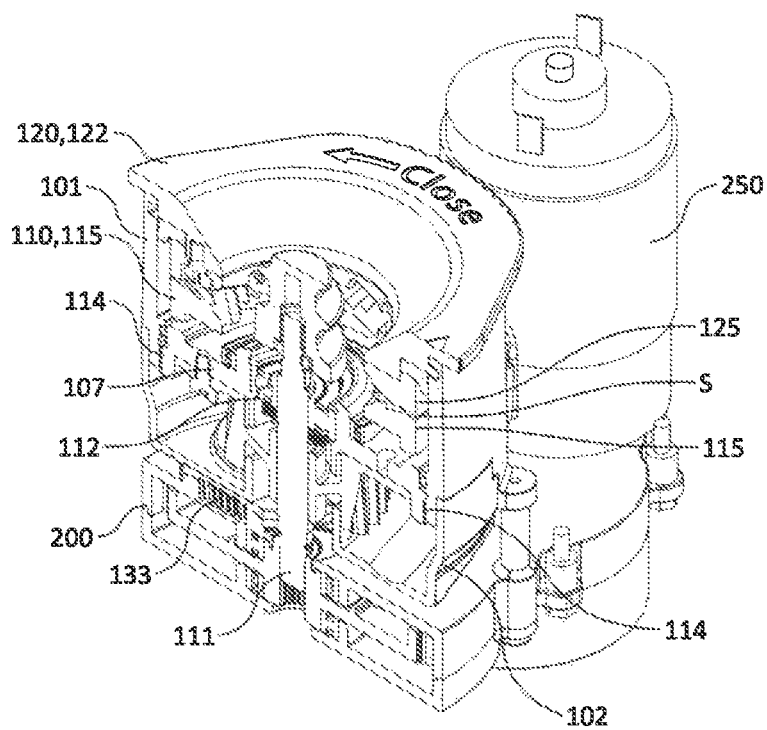
FIG. 5 is a perspective view, partially cross-sectional, of the grinding device of FIG. 2.

A first grinding body 110 and a second grinding body 120 comprise respectively the grinding discs 115, 125. A first and lower of the two grinding bodies, see also FIG. 5, will be described further hereinbelow. This grinding body is motor-driven and suspended in both rotatable and axially adjustable manner in grinding housing 101. A drive shaft 111 of this grinding body 110 also carries the worm or screw 104.

A second and upper 120 of the two grinding bodies is conversely mounted in grinding housing 101 in stationary manner. This second grinding body 120 is shown separately in FIG. 4. On a side facing toward first grinding body 110 the second grinding body comprises a grinding disc 125. Just as the grinding disc 115 lying opposite, this grinding disc 125 is formed from hardened steel or a ceramic material and is thereby sufficiently strong and wear-resistant to perform a large number of grinding cycles on the coffee beans. Grinding disc 125 is fully encased by a collar body 122 of a suitable plastic or another suitable material which provides a user with a comfortable grip, with a knurled peripheral edge. Grinding disc 125 and collar body 122 are durably connected to each other by means of a set of screws 123. In this embodiment a glass-filled polyamide is applied for collar body 122 with a view to strength and durability.

Second grinding body 120 locks into grinding housing 101 by means of a bayonet connection 126, 127. Grinding body 120 can thereby be easily placed and released and has here a defined end position. Provided for this purpose on grinding body 120 are bayonet ribs 126 which are received in and lock into bayonet grooves 116 which co-act therewith and are formed for this purpose in an inner wall of grinding housing 101. Provided on bayonet ribs 126 at their outer ends are protrusions 127 with which ribs 126 will eventually strike against an edge of bayonet grooves 116, and thus always take up this defined end position, during placing of grinding body 120.

Further contributing to this defined end position is a straight edge 121 on collar 122, which comes to lie behind a corresponding straight edge 16 of a spout adapter 14 with which coffee tube 13 is mounted on grinding housing 101 at the position of outflow opening 103. Due to the relative geometry and co-action, spout adapter 14 of coffee tube 13 thus blocks removal of the second grinding body 120. In order to detach second grinding body 120 from grinding housing 101 the tube 13 with adapter 14 must therefore first be removed. Conversely, adapter 14 can only be slid over the edge of outflow opening 103 if second grinding body 120 is placed in its extreme (bayonet) position in grinding housing 101, such that edge 121 comes to lie wholly behind the edge 16 of adapter 14. The latter guarantees that second grinding body 120 will always have to take up a fixed, identical position in grinding housing 101.

With a view to vibration and sound damping of the device the plastic collar 122 which encases the relatively hard grinding disc all around comprises the bayonet ribs 126. With a view to further damping of vibrations a relatively soft, flexible lining 128 of a suitable, optionally natural, rubber such as NBR rubber (nitrile-butadiene rubber) is here arranged on collar 122. This lining 128 comprises a set of damping bodies 129 with which the lining lies against the stop protrusions 127 of bayonet ribs 126. These damping bodies 129 thus form relatively soft stop cushions which, in mounted state, lie against the edges of bayonet grooves 116 in grinding housing 101.

Grinding housing 101 is positioned on a drive platform 200 but, if desired, can be wholly detachable therefrom together with grinding bodies 110, 120. For this purpose grinding housing 101 supports with a set of wings 106 comprised thereby detachably on a set of legs 210 of platform 200. Platform 200 provides space for a main motor 250 which is coupled inside the platform via a fixed, straight gear transmission to a central gear ring 255. An axial toothing is here slidably received at a free outer end of drive shaft 111 of first grinding body 110, which provides for an almost clearance-free yet axially adjustable driving of first grinding body 110 and worm or screw 104. This drive shaft 111 is bearing-mounted and fastened with interposing of a suitable roller bearing assembly 112 in a bottom 107 of grinding housing 101. Internally, drive shaft 111 carries the grinding disc 115 of first grinding body 110 and the worm or screw 104.

Figure 7:
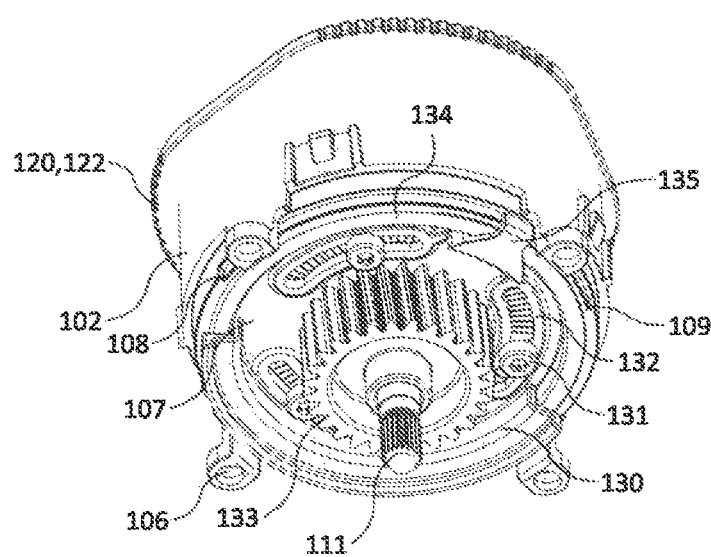
FIG. 7 is a perspective bottom view of the grinding housing of the grinding device of FIG. 1.

Just as the wall of grinding housing 101, the bottom 107 of the grinding housing is formed from aluminium and is connected to the aluminium wall of grinding housing 101 with interposing of a screw thread 114. This provides for a powder-tight closure which nevertheless allows an axial adjustment of the bottom 107 together with the bearing assembly 112 inside grinding housing 101. Externally, an adjusting device 130 is connected to the bottom 107 of the grinding housing, see also FIG. 7. This is a plastic ring which is connected for radial adjustment to bottom 107 by means of a set of screws 131 and radial slots 132 provided therein.

On one side the adjusting device comprises a protrusion 135 and on the other side the adjusting device comprises a toothed collar 133 on which a transmission 230, 265 of drive platform 200 engages. A controllable actuator, which is provided in or on drive platform 200 and in this embodiment is formed by a (second) electric motor 260, comprises this transmission 230, 265. This can be a stepping motor which can be driven at a concrete number of (fractions of) turns (steps) anti-clockwise or clockwise, or a more conventional electric motor which is provided with a tachometer sensor. This sensor registers (counts) a number of (fractions of) turns of a drive shaft of motor 260 and generates this as electronic value.

A number of turns of an output shaft of motor 260 in combination with a transmission ratio of transmission 230 determines a number of turns of the toothed drive shaft 265 with which this rotation is transmitted to gear ring 133 of adjusting device 130. Finally, a transmission ratio between the two toothings of drive shaft 265 and gear ring 133 determines an angular adjustment of bottom 107 in grinding housing 101, to which adjusting device 130 is connected non-rotatably. An axial adjustment of bottom 107 in grinding housing 101, and thereby of the first grinding body 110, 115 connected thereto, can thus be derived from a pitch of the screw thread 114 between bottom 107 and wall 101 of the grinding housing.

A mutual gap (clearance) S between stationary grinding disc 125 and the thus adjustable grinding disc 115 can thus be set and adjusted accurately by controlling the second electric motor 260. Actuator 230 is driven by a control unit of the coffee machine, which is not further shown. The tachometer signal is also supplied thereto, or a calculated control signal is generated thereby. The control unit is thus able to impose on electric motor 230 an exact number of (fractions of) turns which is transmitted via transmission 230, 265 to the toothed collar 133 on bottom 107. As described above, this results in a rotation of bottom 113, with roller bearing assembly 112 and second grinding body 120 therein, inside grinding housing 101. This rotation is converted in screw connection 114 into an axial displacement of bottom 113, together with the roller bearing assembly 112 and second grinding body 120, in grinding housing 101. A clearance S between the thus adjustable driven grinding disc 115 of first grinding body 110 and the stationary grinding disc 125 of the second grinding body 120 received fixedly in grinding housing 101 can thereby be adjusted.

According to the invention, this adjustability is limited to a setting range, an extreme position of which is determined and imposed in the device by at least one stop 108, 109. In this embodiment the grinding housing comprises two of such stops in the form of a set of shoulders 108, 109 on the outer ends of a groove 134 recessed into the wall of the grinding housing, see FIG. 7. The protrusion 135 of the adjusting device runs in this groove 134 and, when reaching an outer end thereof, will strike with a stop surface against the relevant shoulder 108, 109. The resistance encountered thereby is translated into an increased consumption of electric power by the electric motor, which is registered by the control unit as a sign that an extreme boundary of the setting range has been reached, corresponding to a minimum or maximum clearance between the two grinding discs 115, 125.

At least one extreme position of the second grinding body 120, i.e. the one corresponding to the maximum clearance, is thus registered. This is not impeded by the presence of possible grinding residues between grinding discs 115, 125 and can thereby be determined in reliable manner. Just as the minimum clearance, this maximum clearance is a fixed value, known by the control unit, in the device which is determined by the construction. This thus provides a suitable reference from which an absolute value for the clearance S between the two grinding discs 115, 125 can be imparted by the control unit by driving the actuator over a corresponding number of (fractions of) turns.

Figure 6:
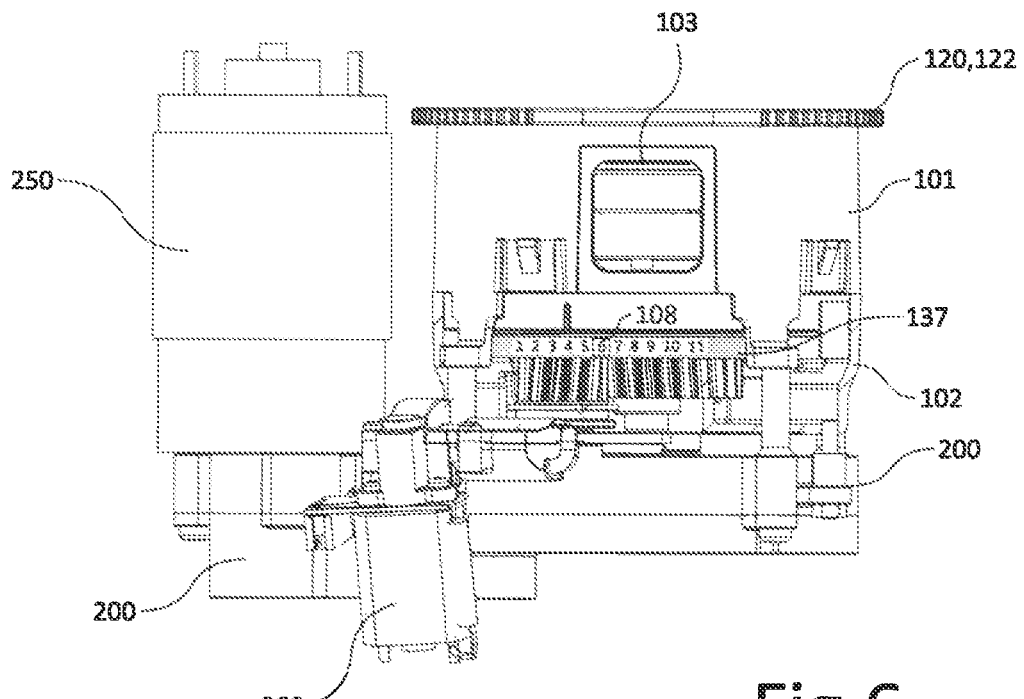
FIG. 6 is a side view of a part of the grinding device of FIG. 1.

Adjusting device 130 has on a periphery a scale division 137, see also FIG. 6, which is concealed behind the plastic casing part 102 of grinding housing 101. This casing part 102 is mounted (snapped fixedly) on(to) grinding housing 101 on an underside. Provided here is a window 108 which exposes a part of scale division 137. An actual clearance between the two grinding discs 115, 125, and thereby an actual grind size of the grinding device, can thus be read as an absolute value via the window.

Figure 8:
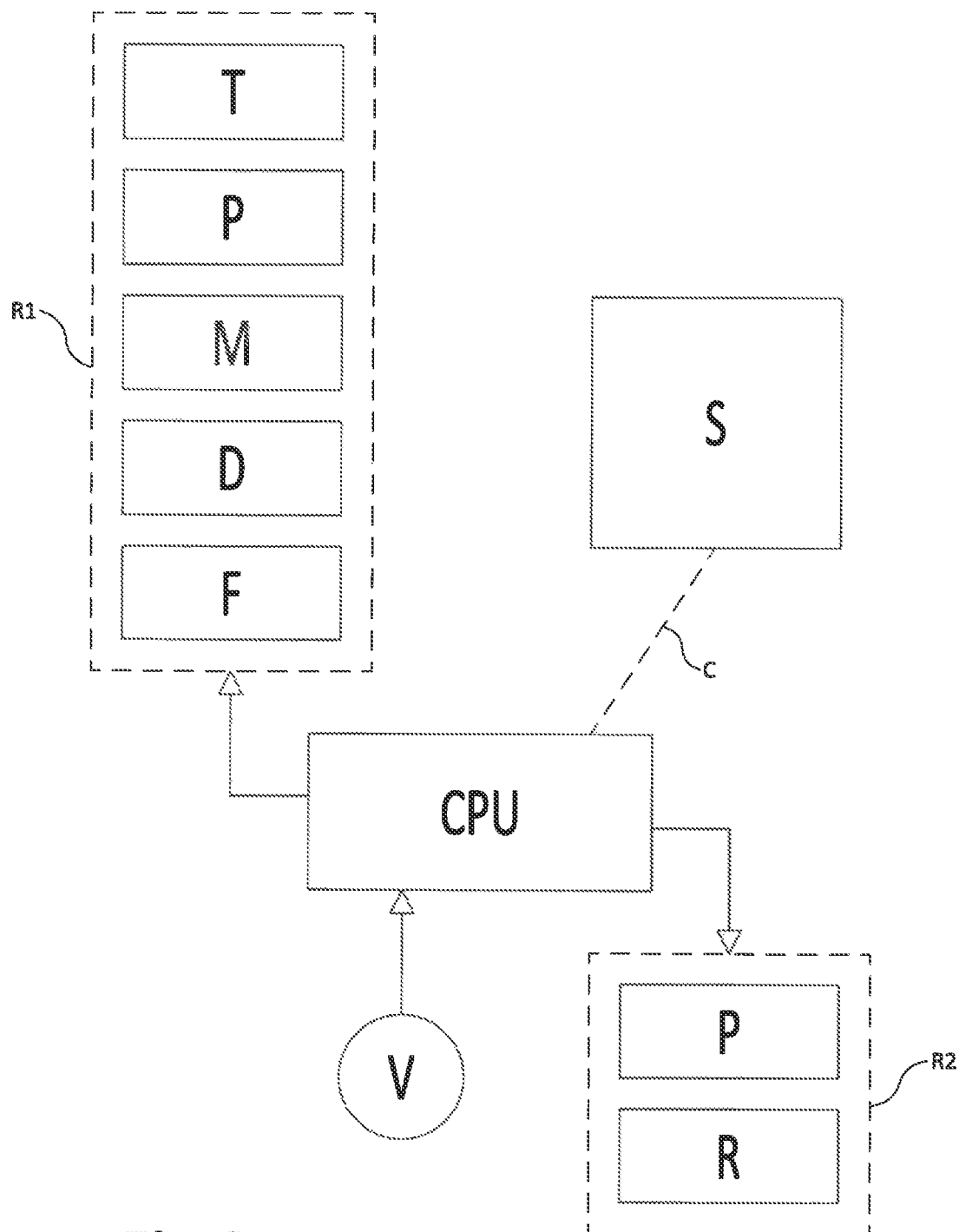
FIG. 8 is a control diagram of an exemplary embodiment of a coffee machine according to the invention.

Depending on a desired coffee product to be produced by the machine, such as for instance coffee or espresso, it is thus not only possible for the machine to dose more or less coffee powder, but also to adapt the grind size thereto in fully automatic manner. Together with a pressure with which the coffee powder is compressed into a compact bed, these are the most important values affecting a coffee-water contact time during the extraction. This coffee-water contact time is in turn an important value which determines the quality and flavour of the final coffee product. FIG. 8 shows schematically a control for the coffee machine.

On the basis of a pre-entered decoction algorithm a preset R1 is imposed, depending on a coffee product to be prepared, on the coffee machine by a control unit CPU. This preset comprises for instance inter alia a grind size M to which the grinding device is set and a determined quantity D of coffee which is dosed and dispensed to an extraction chamber of a decoction device of the machine. The received coffee powder is there compressed into a bed between a pair of pistons with a given pressing force F. Hot water with a determined temperature T and water pressure P is then guided through the coffee bed with a pump in order to obtain a coffee extract therefrom. According to the invention, the device registers here a flow speed V (flow rate) of a liquid flow in the device. This flow speed is registered as volume per unit of time with a suitable sensor (flow sensor) in a liquid conduit of the device, for instance the water conduit from the pump to the extraction chamber and/or the product conduit from the extraction chamber to the outflow of the machine.

A coffee-water contact time can be calculated from the thus known liquid flow V when a determined volume of coffee product is dispensed. If this differs from a standard value for the relevant coffee product, a fine-tuning R2 is used to intervene therein. This fine-tuning comprises for instance a correction of the pump pressure P in the case of a controllable pump and/or an adjustment of an adjustable resistance R in the form of a control of a restriction in the product conduit. The liquid flow V can thus still be readjusted and corrected by the device, which makes a significant contribution to quality, flavour and consistency of the coffee product to be prepared. The central control unit CPU receives said signals and measurement values V and controls the different components on the basis of the decoction algorithm.

The control unit CPU is here particularly coupled to communication means with which a telecommunication connection C to a remotely located server device S can be formed. From there, operational parameters and particularly the decoction algorithm R1 can be obtained and operational values V can be generated. The fine-tuning R2 which has been found necessary for achieving a desired coffee-water contact time can thus be translated either in the machine or remotely (or both) to a change of the preset R1 of for instance the grind size M, dosage D and pressing force F in order to limit these in future. The accurate and absolute setting of the grind size M in the above described grinding device makes it possible here to provide an absolute value to a plurality of machines, whereby a central management and central control thereof is simplified.

Although the invention has been further elucidated above with reference to only a single exemplary embodiment, it will be apparent that the invention is by no means limited thereto. On the contrary, many variations and embodiments are still possible within the scope of the invention for a person with ordinary skill in the art. Instead of an electric motor, an indexed linear actuator can thus also be applied for driving of the adjustable grinding body. Instead of a driven and controlled actuator, an adjusting screw can for instance also be applied as adjusting means for a manual adjustment of the grind size. In all cases the tangible, at least detectable, limitation of the setting range provides a reliable reference from which an absolute value for the clearance between the two grinding discs can be imposed according to the invention.

The invention claimed is:

1. A grinding device comprising a drive means and a grinding housing,
   wherein the grinding housing comprises a set of mutually co-acting grinding bodies with mutually facing grinding surfaces which maintain a mutual clearance,
   wherein at least a driven grinding body of the set of grinding bodies is suspended rotatably about a central axis thereof in the grinding housing and is coupled, or at least can be coupled, operatively to the drive means for performing a rotation about the central axis during operation,
   wherein adjusting means are provided whereby at least an adjustable grinding body of the set of grinding bodies is axially adjustable for imposing a desired mutual clearance between the grinding surfaces,
   wherein an adjustment of the adjustable grinding body is limited from a first extreme position to a second extreme position, corresponding to a fixed setting range between a minimal clearance between the two grinding surfaces and a maximum clearance between the two grinding surfaces, wherein at least one of the first extreme position and the second extreme position of the adjustable grinding body is imposed by a stop which is encountered by the adjusting means in one of the first and second extreme position, wherein the adjusting means comprise a controllable actuator which is or at least can be operatively coupled to the adjustable grinding body in order to impart thereto a controlled axial adjustment along the central axis, wherein the adjustable grinding body comprises a primary screw thread which is operatively engaged with a secondary screw thread of the grinding housing, wherein the actuator comprises an electric motor with an output drive shaft, and wherein a transmission is provided between the drive shaft of the electric motor and the adjustable grinding body so as to impart to the adjustable grinding body a controlled rotation about a collective screw shaft of the primary and secondary screw thread.

2. A coffee machine, comprising the grinding device of claim 1, the grinding device for grinding coffee beans into coffee powder with a determined grind size;

a decoction device with an extraction chamber in which a quantity of coffee powder taken away from the grinding device is received, which decoction device is intended and configured to compress the coffee powder into a bed in the extraction chamber using a pressing force;

an inlet for hot water on an inlet side of the extraction chamber and an outlet for the obtained coffee extract on an outlet side of the extraction chamber;

water supply means which are able and configured to guide a quantity of water with increased temperature to the inlet under increased pressure via a water conduit;

an outflow at which a coffee product can be taken away and which is connected to the outlet of the extraction chamber over a product conduit; and an electronic control unit which is able and configured to impart at least a preset to the coffee machine, comprising one or more of the grind size, the quantity of coffee powder, the pressing force, the quantity of water, the increased pressure and the increased temperature, wherein the electronic control unit is coupled to at least one sensor which is able and configured to register a liquid flow speed through the coffee machine and generate it in the form of an electronic value, particularly a flow speed of a product flow through the product conduit from the extraction chamber or of a water flow through the water conduit to the extraction chamber, wherein the liquid flow can be adjusted at least partially by a fine-tuning and is controlled by the electronic control unit, and wherein the electronic control unit is able and configured on a basis of a received value of the liquid flow speed to impart a fine-tuning to the coffee machine, whereby the liquid flow speed can be tuned to a predetermined value.

3. The coffee machine according to claim 2, wherein the product conduit comprises a controllable restriction and wherein the fine-tuning comprises at least one of a controllable pump and the controllable restriction in the product conduit for a control of at least one of the increased pressure and a resistance of the restriction.

4. The coffee machine according to claim 2, wherein the electronic control unit comprises an electronic memory, in which the defined absolute position is stored, and wherein the electronic control unit is able and configured to impart a resetting process to the grinding device, whereby the grinding device is reset from an adjusted state to the stored position.

5. The coffee machine according to claim 2, wherein the electronic control unit is provided with communication means which are able and configured to form a telecommunication connection with a remotely placed server device in order to generate thereto operational measurement values and receive therefrom one or more control parameters.

6. The coffee machine according to claim 2, wherein the grinding device comprises an adjustable grinding body and wherein the electronic control unit is operatively coupled to adjusting means of the grinding device and, together therewith, is able and configured to impose a defined, absolute position on the adjustable grinding body as part of the preset.

7. The grinding device according to claim 1, wherein the one of the first and second extreme position corresponds to the maximum clearance between the two grinding surfaces.

8. The grinding device according to claim 7, wherein the setting range is imparted on the grinding device by the stop and a further stop, wherein the further stop is encountered by the adjusting means in a further of the first and second extreme position which corresponds to the minimum clearance between the two grinding surfaces.

9. The grinding device according to claim 1, wherein the grinding housing comprises the stop and wherein the adjustable grinding body comprises a stop surface, which stop surface is received on the stop in the one of the first and second extreme position.

10. The grinding device according to claim 9, wherein the adjusting device comprises a scale division and the grinding housing comprises a window, and wherein the adjusting device moves behind the window when the adjustable grinding body is adjusted, while a current setting is visible via the window.

11. The grinding device according to claim 10, wherein the adjusting device comprises a scale division and the grinding housing comprising a window behind which the adjusting device moves when the adjustable grinding body is adjusted, while a current setting is visible via the window.

12. The grinding device according to claim 1, wherein the actuator, at least during operation, can be controlled by a control unit, which control unit is provided with memory means in which a position imposed thereby on the actuator is stored.

13. The grinding device according to claim 1, wherein the at least one adjustable grinding body and the at least one driven grinding body both comprise a first of the set of mutually co-acting grinding bodies.

14. The grinding device according to claim 13, wherein a second, opposite grinding body of the set of mutually co-acting grinding bodies is arranged in stationary manner.

15. The grinding device according to claim 14, wherein provided between the second grinding body and an adjacent part of the grinding housing are damping means which are able and configured to absorb vibrations during operation.

16. The grinding device according to claim 15, wherein the damping means comprise a flexible lining.

17. The grinding device according to claim 14, wherein the second grinding body is connected to the grinding housing in manually detachable manner.

18. The grinding device according to claim 17, wherein the second grinding body can be arranged up to a further stop in the grinding housing and strikes against the further stop when it is placed.

19. The grinding device according to claim 18, wherein a bayonet connection is formed between the second grinding body and the grinding housing.

20. The grinding device according to claim 19, wherein an outflow opening is provided in a wall of the grinding housing, at the position of which opening a powder tube can be coupled releasably to the wall, wherein provided on the second grinding body is a collar which leaves space for the powder tube when the second grinding body strikes against the stop, but prevents coupling of the powder tube in the case of an incomplete placement of the second grinding body.

21. The grinding device according to claim 1, wherein the drive means comprise a drive platform with a main motor and with an actuator, wherein the main motor is or at least can be operatively coupled with a first transmission to the driven grinding body, wherein the actuator is or at least can be operatively coupled with a second transmission to the adjustable grinding body, and wherein the grinding housing is coupled to the drive platform in manually detachable manner.

22. The grinding device according to claim 21, wherein provided between the grinding housing and the drive platform are damping means which are able and configured to absorb vibrations during operation.

23. The grinding device according to claim 22, wherein the damping means comprise a flexible lining.

24. A method for adjusting the grinding device according to claim 1, wherein the adjustable grinding body is carried to the one of the first and second extreme position, corresponding to the maximum clearance between the two grinding bodies, until the stop is encountered by the adjusting means in the one extreme position, and wherein the adjustable grinding body is reset from the one extreme position to a position to be imposed.

25. The method according to claim 24, wherein the adjusting means comprise an actuator which can be driven and which is controlled by a control unit, wherein the control unit reads a position to be imposed on the actuator from memory means, and wherein the control unit controls the actuator on the basis of the position to be imposed, obtained from the memory means.

* * * * *